US009209957B2

(12) United States Patent
Yu (10) Patent No.: US 9,209,957 B2
(45) Date of Patent: *Dec. 8, 2015

(54) SYSTEMS AND METHODS FOR SELECTING DIGITAL CONTENT CHANNELS USING LOW NOISE BLOCK CONVERTERS INCLUDING DIGITAL CHANNELIZER SWITCHES

(71) Applicant: Entropic Communications, Inc., San Diego, CA (US)

(72) Inventor: Tommy Yu, Orange, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,443

(22) Filed: Jul. 17, 2014

(65) Prior Publication Data

US 2014/0328437 A1 Nov. 6, 2014

Related U.S. Application Data

(62) Division of application No. 13/355,413, filed on Jan. 20, 2012.

(60) Provisional application No. 61/435,119, filed on Jan. 21, 2011.

(51) Int. Cl.
*H04L 27/06* (2006.01)
*H04L 5/06* (2006.01)

(52) U.S. Cl.
CPC .......................................... *H04L 5/06* (2013.01)

(58) Field of Classification Search
CPC ........................................................ H04L 5/06
USPC ....................................................... 375/340
See application file for complete search history.

(56) References Cited

U.S. PATENT DOCUMENTS 5,856,804 A * 1/1999 Turcotte et al. ............... 342/371
6,016,426 A   1/2000 Bodell et al.
(Continued)

FOREIGN PATENT DOCUMENTS

WO   2012100220 A2   7/2012
WO   2012112693 A1   8/2012
WO   2012100220 A3   10/2013

OTHER PUBLICATIONS

International Search Report and Written Opinion for International Application PCT/US2012/025268, International Filing Date Feb. 15, 2012, Search Completed Apr. 9, 2012, Mailed Apr. 18, 2012, 6 pages.

(Continued)

*Primary Examiner* — Lihong Yu
(74) *Attorney, Agent, or Firm* — McAndrews, Held & Malloy, Ltd.

(57) ABSTRACT

Systems and methods in accordance with embodiments of the invention include converting satellite signals to an intermediate frequency signal for content decoding, and selecting modulated digital data within the satellite signals for content decoding using digital signal processing. One embodiment includes a system configured to select at least one content channel from an input signal including a plurality of content channels modulated onto a carrier, the system including: a digital channelizer switch including: a high speed analog to digital converter configured to digitize the intermediate frequency signal; a digital channelizer configured to digitally tune a content channel from the digitized intermediate frequency signal; and a high speed digital to analog converter configured to generate an analog output signal using the content channel digitally tuned from the digitized intermediate frequency signal by the digital channelizer.

10 Claims, 11 Drawing Sheets

(56) References Cited

U.S. PATENT DOCUMENTS

| | | | |
|---|---|---|---|
| 6,094,158 A | 7/2000 | Williams | |
| 6,191,781 B1 | 2/2001 | Chaney et al. | |
| 6,198,449 B1 * | 3/2001 | Muhlhauser et al. | 343/753 |
| 6,205,185 B1 * | 3/2001 | Kajiwara | 375/316 |
| 7,075,585 B2 * | 7/2006 | Favrat et al. | 348/554 |
| 7,145,972 B2 | 12/2006 | Kumar et al. | |
| 7,272,375 B2 * | 9/2007 | Tuttle et al. | 455/333 |
| 7,477,871 B1 | 1/2009 | Gurantz et al. | |
| 7,620,127 B1 * | 11/2009 | Koenck et al. | 375/340 |
| 7,623,580 B2 | 11/2009 | McNaught-Davis Hess et al. | |
| 7,848,303 B2 | 12/2010 | Lindstrom et al. | |
| 2004/0041554 A1 * | 3/2004 | Miyauchi | 324/76.19 |
| 2005/0094714 A1 | 5/2005 | Robinson | |
| 2005/0190777 A1 | 9/2005 | Hess et al. | |
| 2006/0003728 A1 | 1/2006 | Tuttle et al. | |
| 2007/0064157 A1 | 3/2007 | Kasamatsu et al. | |
| 2010/0107211 A1 | 4/2010 | Chou | |
| 2010/0172446 A1 | 7/2010 | Popoli | |
| 2010/0303181 A1 | 12/2010 | Yu | |
| 2011/0283330 A1 | 11/2011 | Wang | |
| 2012/0163290 A1 | 6/2012 | Krafft | |
| 2012/0189084 A1 | 7/2012 | Yu | |
| 2012/0213514 A1 | 8/2012 | Yu | |
| 2012/0236845 A1 | 9/2012 | Li et al. | |

OTHER PUBLICATIONS

International Search Report and Written Opinion for International Application PCT/US2012/22109, International Filing Date Jan. 20, 2012, Report Completed Mar. 26, 2012, Mailed Apr. 9, 2012, 8 pages.

* cited by examiner

SYSTEMS AND METHODS FOR SELECTING DIGITAL CONTENT CHANNELS USING LOW NOISE BLOCK CONVERTERS INCLUDING DIGITAL CHANNELIZER SWITCHES

RELATED APPLICATIONS

This application is a divisional of U.S. application Ser. No. 13/355,413 filed Jan. 20, 2012, which claims priority to U.S. Provisional Application 61/435,119 filed Jan. 21, 2011, the entirety of which is incorporated herein by reference.

FIELD OF THE INVENTION

The present invention relates to conversion of satellite signals to an intermediate frequency (IF) for content decoding and selection of data within satellite signals for content decoding.

BACKGROUND OF THE INVENTION

Figure 1:
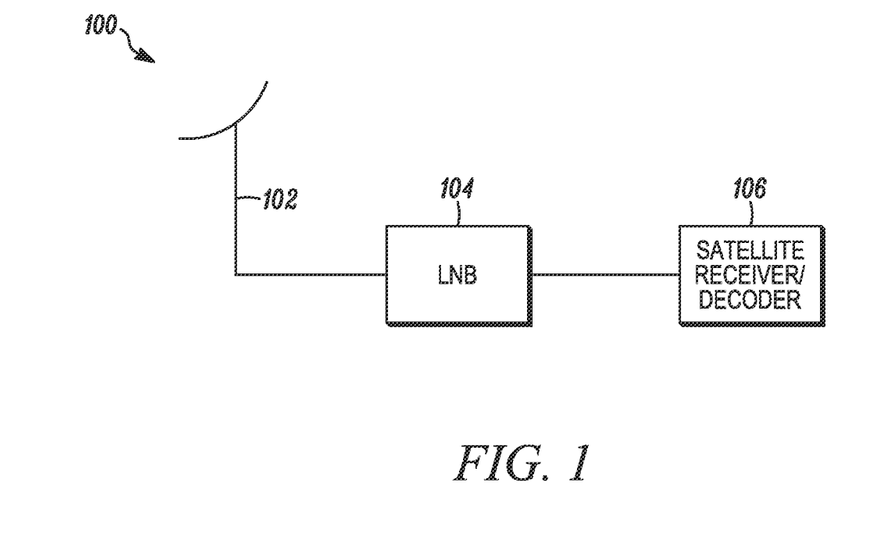
FIG. 1 illustrates a system diagram of a typical satellite downlink.

Content may be transmitted by a geosynchronous satellite communication network to users for decoding and playback. A system diagram of a typical satellite download link is illustrated in FIG. 1. The satellite downlink 100 includes a satellite antenna 102 connected to a low noise block converter (LNB) 104. The LNB is connected to a satellite receiver/decoder 106. The satellite can transmit signals including content channels modulated on a carrier. The content channels can be analog content channels or digital content channels. In many systems, data is modulated onto the same carrier using different polarizations. Where digital content channels are modulated onto a carrier, the digital data modulated on the carrier can include a plurality of digital content channels, each of which typically includes at least one video and/or audio stream.

In many instances, a signal containing multiple content channels is transmitted to a satellite network from an uplink facility. A transponder on the satellite then transmits a signal that can be received by a number of satellite antennas 102. The received signal is then passed to a LNB 104, which down converts the signal to an intermediate frequency (IF). Lastly, the IF signal is passed to a satellite receiver/decoder 106, such as a set top box, where the signal containing content is demodulated and decoded (i.e. audio and/or video) for playback.

In this way, information transmitted as relatively high frequency satellite signals, usually as microwave signals, may be converted to similar signals at a much lower frequency, usually known as an intermediate frequency (IF) compatible with the electronics of the decoding device and/or cabling used to connect an LNB to a satellite receiver/decoder. A content channel is the digital data modulated onto a carrier frequency within the IF signal. Users may then receive selected content channels as IF signals for decoding and use. Representations of the frequency spectra of signals during various stages in the down-conversion of satellite communication signals is illustrated FIGS. 2A, 2B and 2C.

Figure 2A:
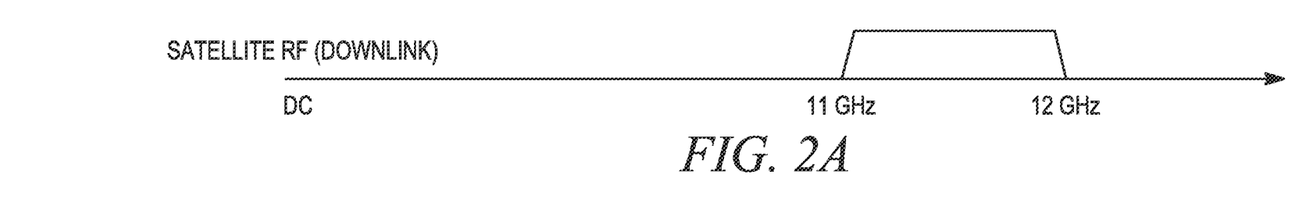
FIG. 2A illustrates a typical satellite radio frequency (RF) signal for downlinking.

Radio frequency (RF) signals are typically transmitted by a satellite to a receiver at high frequencies. A typical satellite radio frequency (RF) signal for downlinking is illustrated in FIG. 2A. As illustrated, the signal is transmitted at high frequencies, spanning from 11 GHz to 12 GHz. A satellite signal when received by a satellite signal receiver is usually weak after traveling great distances during transmission and is of a relatively high frequency. When signals are sent through coaxial cables, the higher the frequency, the greater the losses that occur in the cable per unit of length.

Figure 2B:
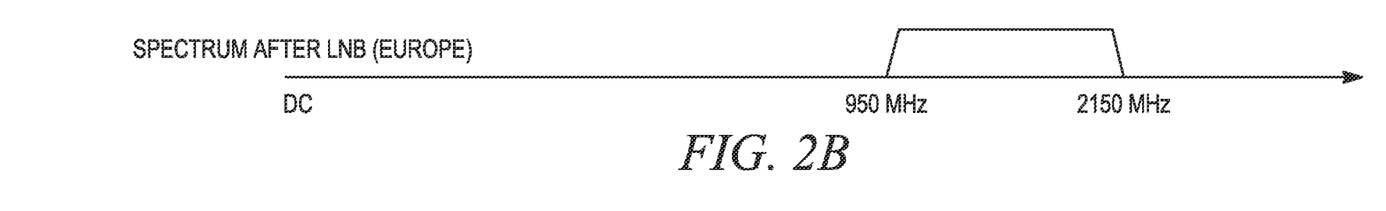
FIG. 2B illustrates the frequency spectrum of satellite signals when processed by a LNB in accordance with European standards.
Figure 2C:
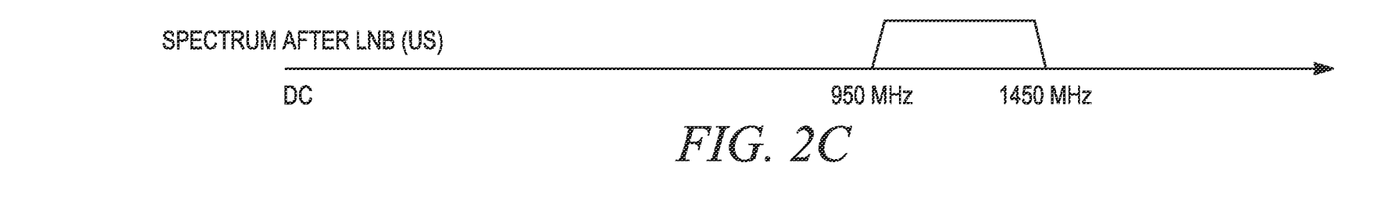
FIG. 2C illustrates the frequency spectrum of satellite signals when processed by a LNB in accordance with U.S. standards.

A LNB may be used to amplify and convert these high frequency signals to a lower, more manageable frequency. The frequency spectrum of satellite signals processed by a LNB is illustrated in FIGS. 2B and 2C. In Europe, the frequency spectrum of LNB processed signals may be from 950 MHz to 2150 MHz (see FIG. 2B). In the United States (U.S.), the frequency spectrum of LNB processed signals may be from 950 MHz to 1450 MHz (see FIG. 2C).

Figure 2D:
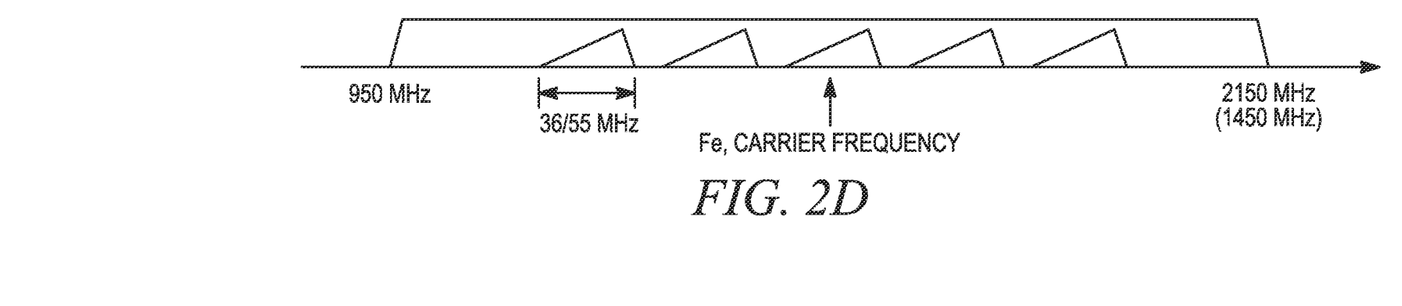
FIG. 2D illustrates typical frequency spectrum for modulated digital data on a plurality of content channels within an L-Band IF signal generated by a LNB.

Signals containing content received from a satellite typically include multiple content channels in the frequency band of the carrier signal. Typical frequency spectrum for carrier frequencies of channels of encoded digital data carried by the IF signal processed by a typical LNB is illustrated in FIG. 2D. Here, the frequency band spans from 950 MHz to 2150 MHz or 1450 MHz and there are multiple 36/55 MHz content channels in this frequency band. In order for a user to decode selected media, an L-band tuner may be used to select the desired channel. For example, a certain carrier frequency may be selected where a 36/55 MHz band may be transferred to a receiver/decoder for use by the user.

Figure 3:
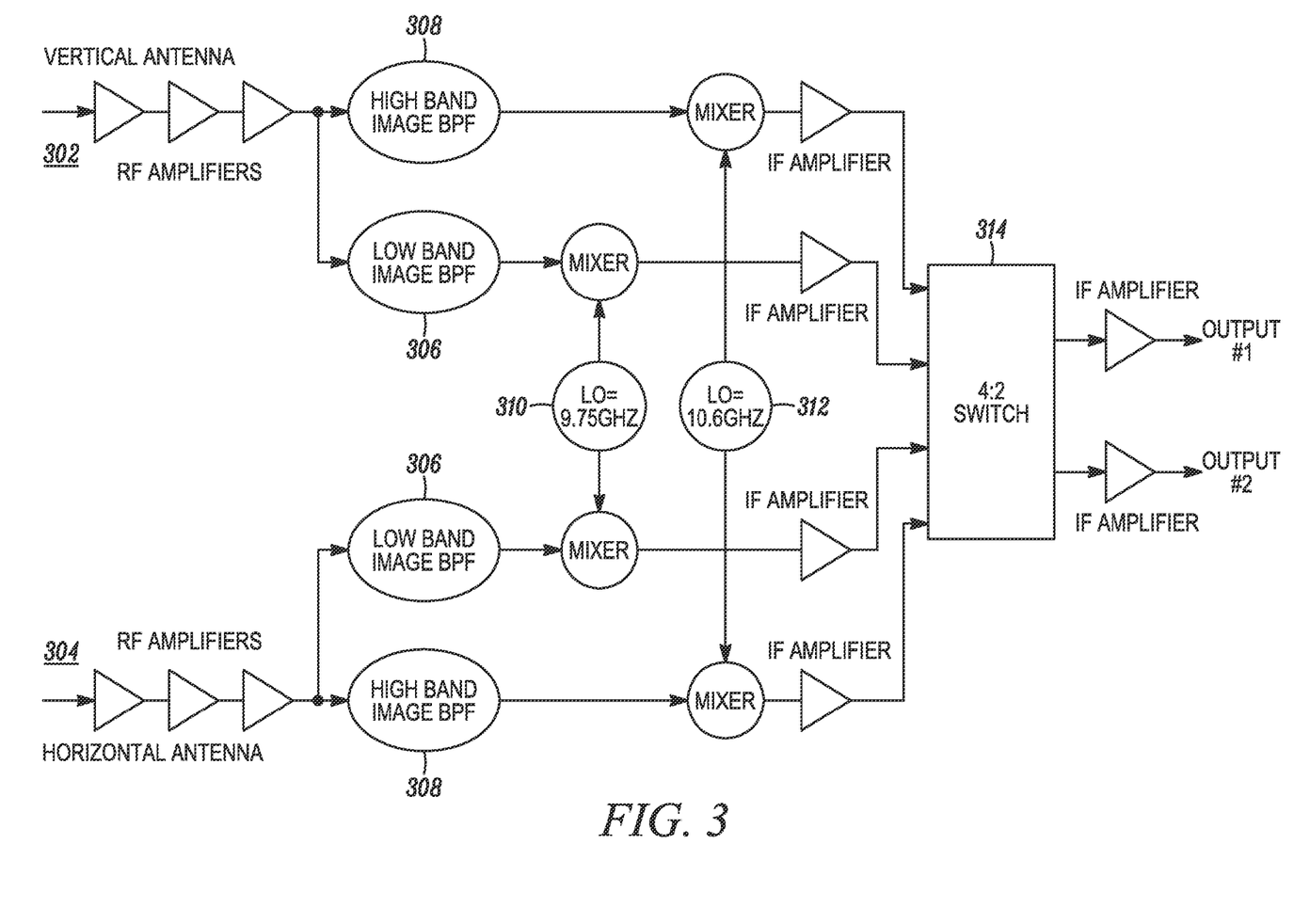
FIG. 3 illustrates typical universal LNB architecture with dual outputs.

LNBs can be implemented in many ways using many different LNB architectures. FIG. 3 illustrates a diagram of a typical universal LNB architecture with dual outputs. In this architecture, the LNB receives two RF input signals from the satellite. One signal is for the vertical polarization antenna 302 and the other is for the horizontal polarization antenna 304. For example, the frequency band of both signals may be from 10.7-12.75 GHz. The LNB first separates the signal into two bands with two band pass filters, a low band 306 (10.7-11.7 GHz) and a high band 308 (11.7-12.75 GHz). Low band signals are mixed down to 950-1950 MHz with local oscillator (LO) 310 at 9.75 GHz. The LO is the frequency used in the LNB to block convert the frequency of the satellite signal, or transponder frequency, to a lower frequency band. High band signals are mixed down to 1100-2150 MHz with LO 312 at 10.6 GHz. Output signals are selected from the four down converted L-band signals with a 4:2 multiplexer 314 in response to request for specific channels from the decode device. Using the Universal LNB illustrated in FIG. 3, viewers can only tune to content on two of the 1 GHz L-band channels at any time. Additional cables are required for users to watch content from one of the other two 1 GHz L-band channels.

Figure 4:
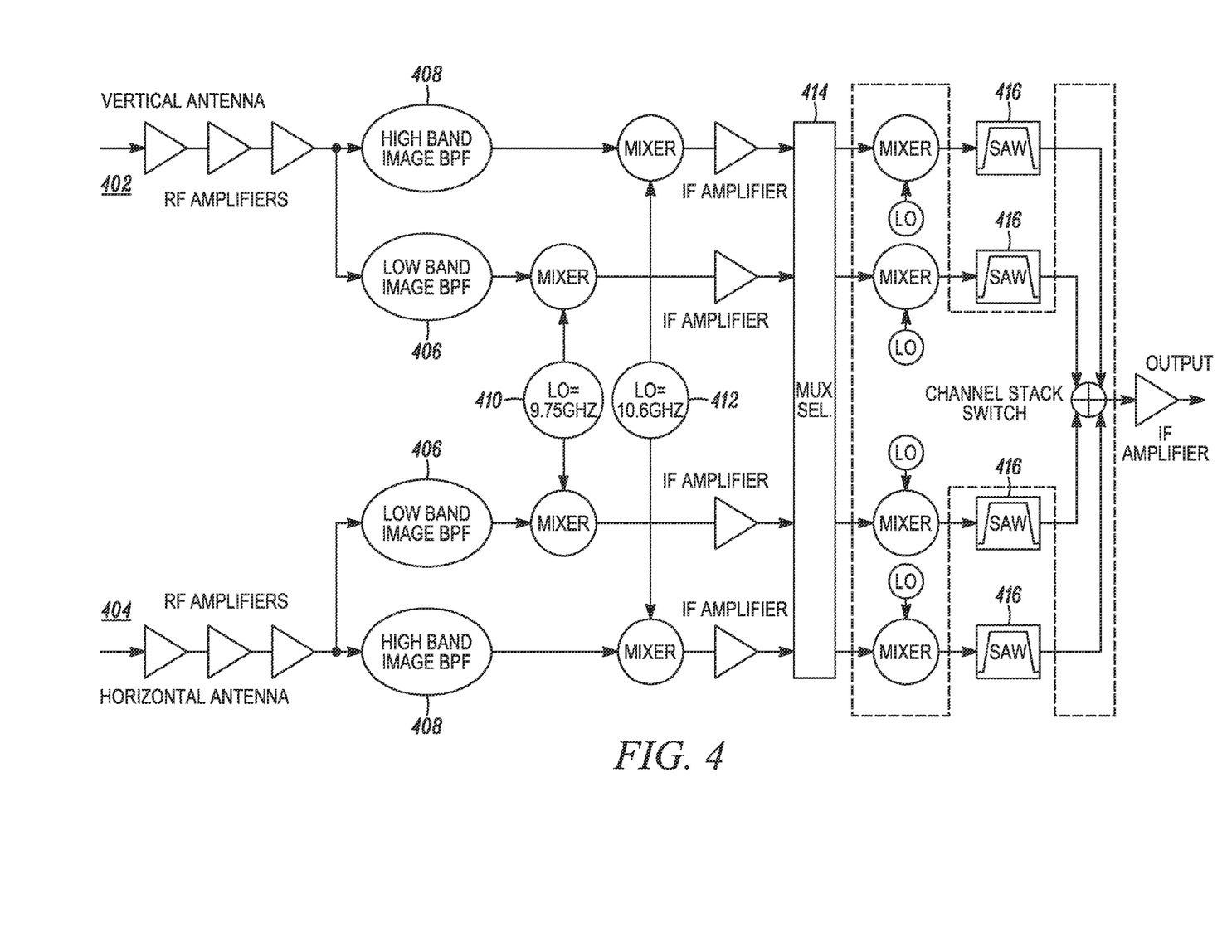
FIG. 4 illustrates typical single cable LNB architecture configured to generate an output signal with up to four content channels re-modulated to different frequencies.

Single cable LNB architectures have been developed to reduce the amount of cabling involved in providing a system that can provide content from all four of the 1 GHz L-band signals produced by the LNB. A diagram of a typical single cable LNB design supporting up to four satellite content channels in one cable is illustrated in FIG. 4. In the illustrated single cable LNB architecture, the LNB receives two RF input signals from the satellite in a manner similar to FIG. 3. One is for the vertical polarization antenna 402 and the other is for the horizontal polarization antenna 404. In many systems, the frequency band of both signals may be from 10.7-12.75 GHz. The LNB first separates the signal into two bands with two band pass filters, a low band 406 (10.7-11.7 GHz) and a high band 408 (11.7-12.75 GHz). Low band signals are mixed down to 950-1950 MHz with a LO 410 at 9.75 GHz. High band signals are mixed down to 1100-2150 MHz with a LO 412 at 10.6 GHz. Four content channels (i.e. a channel within the L-band signal containing digital data modulated onto a specific carrier frequency) from these four L-band signals are selected with a multiplexer 414 and mixed to four new carrier frequencies using four mixers. Four surface acoustic wave (SAW) filters 416 are then used to remove the unselected channels in the band.

SUMMARY OF THE INVENTION

Systems and methods in accordance with embodiments of the invention include converting satellite signals to an IF frequency signal for content decoding, and selecting modulated digital data within the satellite signals for content decoding using digital signal processing. One embodiment includes a system configured to select at least one content channel from an input signal including a plurality of content channels modulated onto a carrier, the system including: an input configured to receive an input signal comprising a plurality of content channels modulated on a carrier; a mixer configured to down convert the plurality of content channels to an intermediate frequency signal; a digital channelizer switch including: a high speed analog to digital converter configured to digitize the intermediate frequency signal; a digital channelizer configured to digitally tune a content channel from the digitized intermediate frequency signal; and a high speed digital to analog converter configured to generate an analog output signal using the content channel digitally tuned from the digitized intermediate frequency signal by the digital channelizer.

In a further embodiment, the mixer includes a local oscillator.

In another embodiment, the content channel includes a digital content channel.

In a still further embodiment, the content channel includes an analog content channel.

In still another embodiment, the frequency of the input signal is in the range from 10.7 GHz to 12.75 GHz.

In a yet further embodiment, the frequency of the intermediate frequency signal is in the range from 0.2 GHz to 2.25 GHz.

In yet another embodiment, the frequency of the analog output signal is in the range from 950 MHz to 2150 MHz.

In a further embodiment again, the frequency of the analog output signal is in the range from 950 MHz to 1450 MHz.

In another embodiment again, the high speed analog to digital converter is configured to sample the intermediate frequency signal at a frequency at least twice the highest frequency of the intermediate frequency signal.

A further additional embodiment includes a system configured to select at least one content channel from a plurality of input signals, where each input signal includes a plurality of content channels modulated on a carrier, the system including: a plurality of inputs, where each of the plurality of inputs is configured to receive an input signal including a plurality of content channels modulated on a carrier; a plurality of mixers, where each mixer is connected to an input and is configured to down convert the content channels to an intermediate frequency signal; a digital channelizer switch including: a plurality of high speed analog to digital converters, where each high speed analog to digital converter is configured to digitize an intermediate frequency signal generated by one of the mixers; a plurality of digital channelizers, where each digital channelizer is configured to digitally tune a content channel from a digitized intermediate frequency signal generated by one of the high speed analog to digital converters; a multiplexer configured to select digitized intermediate frequency signals generated by the plurality of high speed analog to digital converters as inputs to the plurality of digital channelizers; and at least one high speed digital to analog converter, where each high speed digital to analog converter is configured to generate an analog output signal using a content channel digitally tuned from one of the at least one digitized intermediate frequency signals by a digital channelizer.

In another additional embodiment, the digital channelizer switch further includes a common combiner configured to digitally combine a plurality of content channels digitally tuned from at least one of the digitized intermediate frequency signals by the plurality of digital channelizers; and one of the at least one high speed digital to analog converters is configured to generate an analog output signal using the output of the common combiner.

In a still yet further embodiment, the mixer comprises a local oscillator.

In still yet another embodiment, the content channel comprises a digital content channel.

In a still further embodiment again, the content channel comprises an analog content channel.

In a still another embodiment again, the frequency of the input signal is in the range from 10.7 GHz to 12.75 GHz.

In a still further additional embodiment, the frequency of the intermediate frequency signal is in the range from 0.2 GHz to 2.25 GHz.

In still another additional embodiment, the frequency of the analog output signal is in the range from 950 MHz to 2150 MHz.

In a yet further embodiment again, the frequency of the analog output signal is in the range from 950 MHz to 1450 MHz.

In yet another embodiment again, the high speed analog to digital converter is configured to sample the intermediate frequency signal at a frequency at least twice the highest frequency of the intermediate frequency signal.

A yet further additional embodiment includes a method of selecting at least one content channel from at least one input signal, where each input signal includes a plurality of content channels modulated on a carrier, the method including: receiving at least one input signal, where each input signal includes a plurality of content channels modulated on a carrier; down converting the plurality of content channels on each of the at least one input signals to an intermediate frequency signal using at least one mixer; digitizing each of the intermediate frequency signals using at least one high speed analog to digital converter; digitally tuning at least one content channel from the at least one digitized intermediate frequency signals using at least one digital channelizer; and generating at least one analog output signal from at least one digital content channel digitally tuned from a digitized intermediate frequency signal using at least one digital to analog converter.

DETAILED DISCLOSURE OF THE INVENTION

Turning now to the drawings, systems and methods for converting satellite signals to an IF frequency signal for content decoding, and selecting modulated digital data within the satellite signals for content decoding using digital signal processing are disclosed in accordance with embodiments of the invention. In various embodiments, analog circuitry is utilized to generate an IF signal that is then digitized to enable selection of the modulated digital data within the received satellite signal to provide to a satellite receiver/decoder using digital signal processing techniques. Once selection is performed using digital signal processing, the selected modulated digital data is converted back to an analog signal and output by the LNB. In several embodiments, a digital channelizer of a digital channelizer switch is used to separate or digitally tune the content of a single content channel (i.e. digital data modulated onto a specific carrier frequency) from the signals received via the satellite downlink. A digital channelizer switch can include at least one digital channelizer, which when used in conjunction with a multiplexer, enables selection of content from a digitized intermediate frequency signal. Digital channelizer switches can be utilized in a variety of LNB architectures, including a universal LNB architecture or a single cable LNB architecture. LNBs in accordance with many embodiments of the invention can utilize analog to digital converters (ADC) and digital to analog converters (DAC) such as the ADCs and DACs developed by Mobius Semiconductor Inc. of Irvine, Calif., which can sample at multiple GHz and dissipate less power than the traditional RF mixer based tuner. Down converted satellite band signals may typically be between 950-2150 MHz. The sample rate needs to be at least two times the maximum frequency. Therefore, certain embodiments use an ADC or DACs developed by Mobius Semiconductor Inc. with a maximum sample rate of 6 GHz.

In a number of embodiments, utilizing a high frequency low power analog to digital converter to digitize L-band signals, a digital channelizer to select modulated digital data from the digitized signal, and a digital to analog converter to generate an analog output signal can significantly reduce the power consumption and component cost of the LNB. In addition, content channel switching may be done instantaneously without settling time due to usage of digital circuitry. Furthermore, the use of digital components can result in an LNB architecture that is easily scalable allowing the construction of single cable LNBs that are powered by the decoder device via the coaxial cable and that can mix a number of content channels onto an output signal that is only constrained by the requirements of the application (e.g. mixing the modulated digital data of 24 content channels onto a single L-band output signal). In this way, LNBs can be constructed in accordance with embodiments of the invention that overcome power and cost constraints that may be imposed by the use of analog components. LNBs and the use of high speed low power analog to digital converters, and digital channelizers in accordance with embodiments of the invention are discussed further below.

General LNB Architecture with Digital Channelizer Switch

Figure 5:
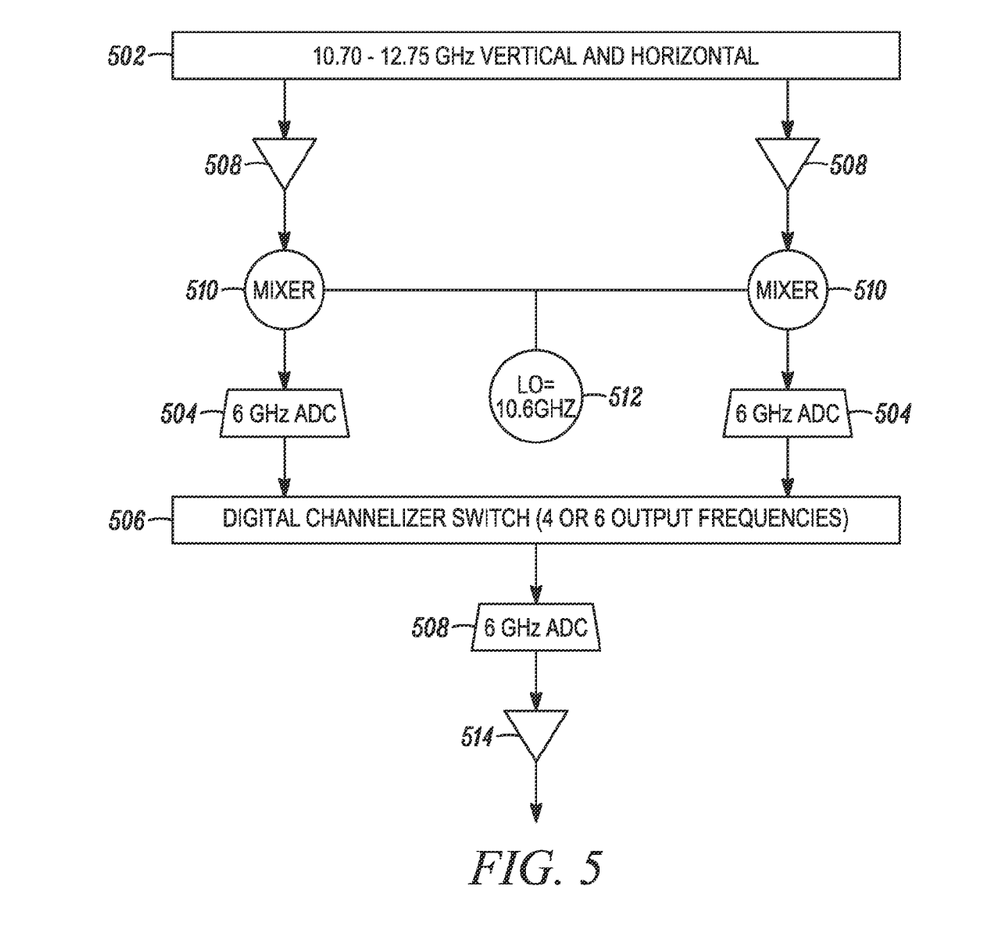
FIG. 5 illustrates a single cable LNB with a digital channelizer switch in accordance with an embodiment of the invention.

Digital channelizer switches can be integrated into any of a variety of LNB architectures, including commonly used architectures such as universal LNBs or single cable LNBs. A general LNB architecture including a digital channelizer switch in accordance with an embodiment of the invention is illustrated in FIG. 5. In many embodiments, the LNB receives two RF input signals 502 from a satellite. One signal is for the vertical polarization antenna and the other is for the horizontal polarization antenna. For example, the frequency band of both signals may be from 10.7-12.75 GHz. In other embodiments, the frequency band of the signals is the C-band (4-6 GHz), the X-band (8 GHz), the Ka-band (20-30 GHz) and/or any other band appropriate to a specific application. The RF input signals are connected to two amplifiers 508. The two amplifiers are each connected to different mixers 510. Both mixers 510 are connected with a LO 512. In the illustrated embodiment, both frequency bands are mixed down with a LO at 10.5 GHz. In other embodiments, another LO appropriate to the requirements of the application can be utilized. Each mixer 510 is also connected to different ADCs 504. Each down converted signal is sampled by an ADC 504 with sample frequency at 6 GHz. Both ADCs 504 are connected to a digital channelizer switch 506. The digital channelizer switch 506 is connected to a digital to analog converter (DAC) 508. The DAC 508 is connected to an amplifier 514. The desired content channel within the satellite signal is selected with the digital channelizer switch 506 and converted to an L-band signal with a high speed DAC 508 sampled at 6 GHz. In this example, there may be 4 or 6 output frequencies or content channels selected by the digital channelizer 506. However, the output frequencies and number of content channels can be arbitrary. Although a specific configuration is illustrated in FIG. 5, any of a variety of architectures can be utilized appropriate to the characteristics of the signal received by the LNB.

Universal LNB Architecture

Figure 6:
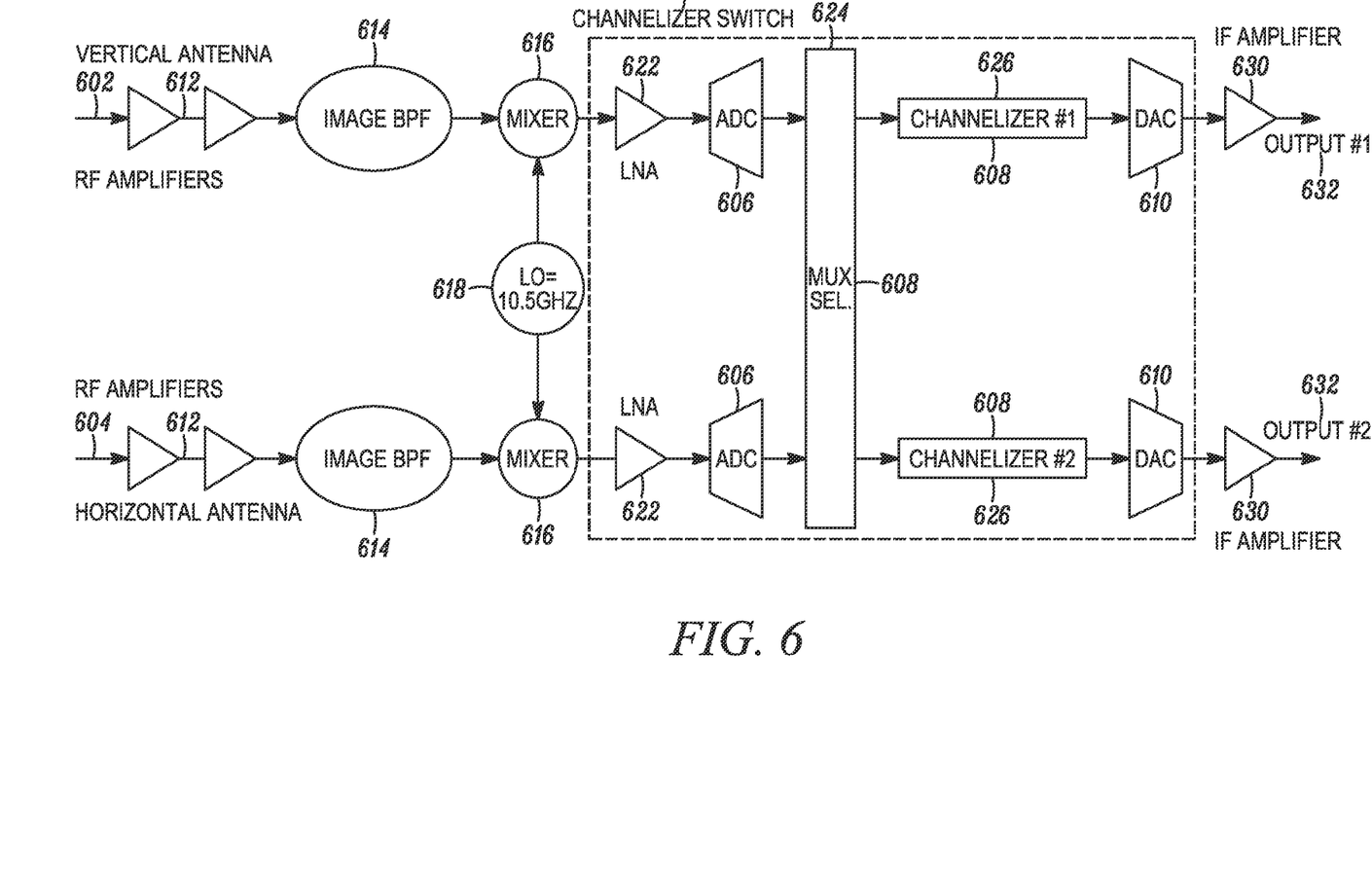
FIG. 6 illustrates a universal LNB including a digital channelizer switch in accordance with an embodiment of the invention.

Digital channelizer switches in accordance with many embodiments of the invention may be integrated into a universal LNB. A universal LNB including an ADC based digital channelizer switch in accordance with an embodiment of the invention is illustrated in FIG. 6. In the illustrated universal LNB architecture, an input for the vertical antenna 602 and an input for the horizontal antenna 604 are each connected to different RF amplifiers 612. Each of the RF amplifiers 612 is connected to a different image band pass filter (BPF) 614. Each band pass filter 614 is connected to a different mixer 616. Each mixer 616 is associated to a common LO 618. Each mixer 616 is connected to a digital channelizer switch 620 via a respective input to different low noise amplifiers (LNA)

622. Each LNA 622 is connected to a different analog to digital converter (ADC) 606. Each ADC 606 is connected to a common multiplexer, or multiplexer selector (Mux Sel) 624. For ease of discussion, the terms multiplexers and multiplexer selectors are interchangeably used. The Mux Sel 624 is connected to two different digital channelizers 626. Each channelizer 626 is connected to a different DAC 610. Each DAC 610 is connected to different IF amplifiers 630. Each IF amplifier 630 is connected to a different output 632.

In many embodiments, the LNB receives two RF input signals from the satellite. One signal is for the vertical polarization antenna 602 and the other is for the horizontal polarization antenna 604. For example, the frequency band of both signals may be from 10.7-12.75 GHz. Both frequency bands are mixed down to 0.2-2.25 GHz with one mixer at 10.5 GHz. Each down converted signal is sampled by an ADC 606 with sample frequency at 6 GHz. The desired content channel for the output frequency band is selected with digital circuitry 608 through use of channelizers 626 and converted to an L-band signal with a high speed DAC 610 sampled at 6 GHz. Although this illustrated embodiment employs two outputs, an arbitrary number of outputs can be achieved in embodiments of the invention by adding corresponding channelizers to serve the desired number of outputs.

Although the generation of two L-band outputs from two down converted satellite signals is shown in FIG. 6, ADC based channelizer switches in accordance with embodiments of the invention can be utilized to generate any number of L-band output signals from any number of IF input signals including but not limited to generating four L-band output signals from two IF input signals, generating two L-band output signals from four IF input signals, selecting four L-band output signals from four IF input signals, and selecting eight L-band output signals from four IF input signals, In many embodiments, digital circuitry 608 takes the place of functions performed by analog circuitry in conventional LNB architectures. For example, the number of analog circuits, such as RF mixers, local oscillators, and band pass filters, are reduced in comparison with the equivalent analog circuitry shown in FIG. 3. Replacement of analog components with digital components can provide savings in power and cost. Analog RF switching circuitry can also have a settling time when switching between different inputs. An equivalent digital implementation in accordance with an embodiment of the invention may have switching times of the order of one clock cycle, which may be in the nanosecond range. The fast switching time can provide a more seamless user experience.

Single Channel LNB Architecture

Figure 7:
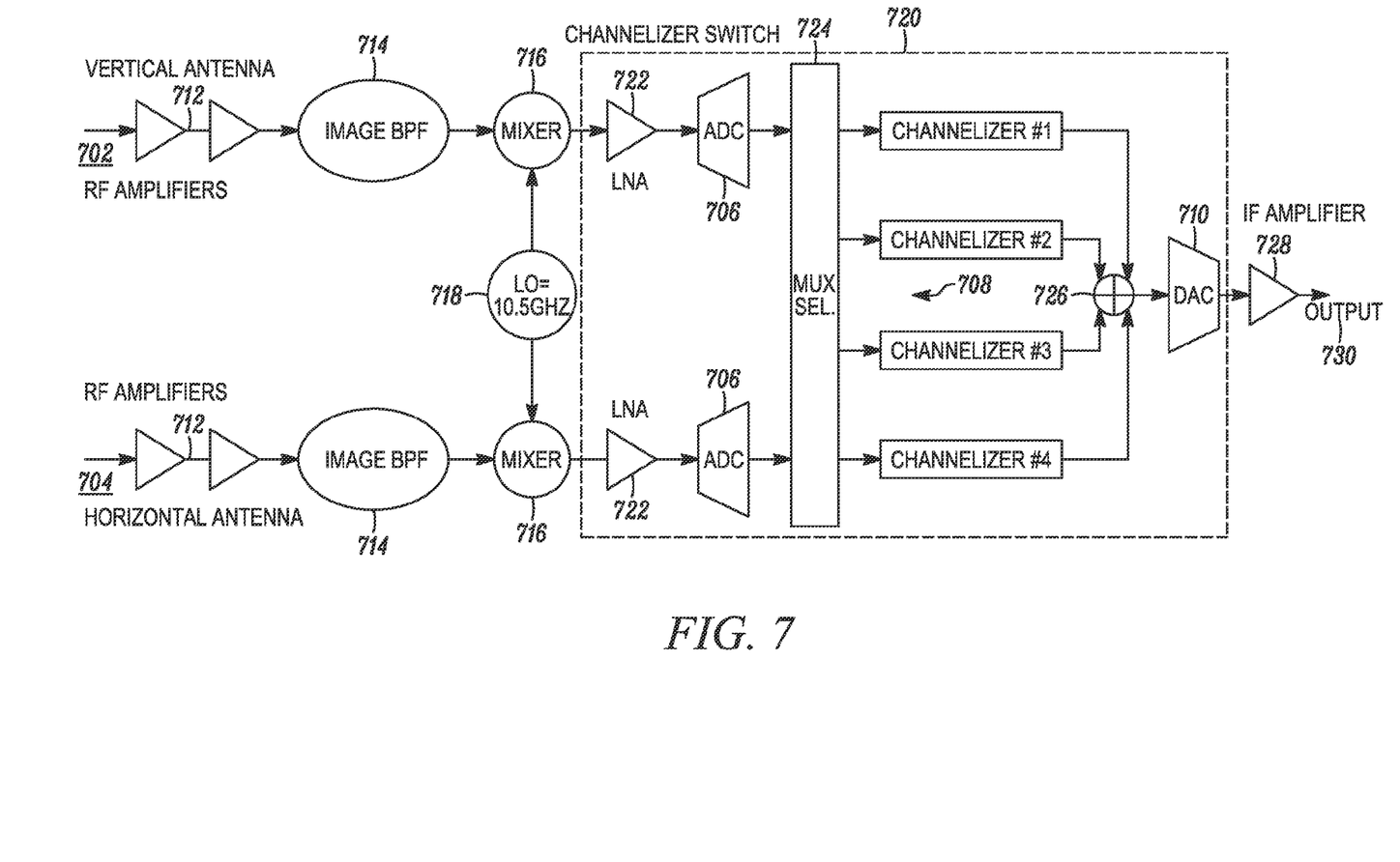
FIG. 7 illustrates a single cable LNB including a digital channelizer switch with four digital channelizers in accordance with an embodiment of the invention.

Digital channelizer switches in accordance with many embodiments of the invention may be integrated into a single channel LNB. A single cable LNB including a digital channelizer switch in accordance with an embodiment of the invention is illustrated in FIG. 7. In many embodiments, an input for the vertical antenna 702 and an input for the horizontal antenna 704 are each connected to different RF amplifiers 712. Each of the RF amplifiers 712 is connected to a different image band pass filter (BPF) 714. Each band pass filter 714 is connected to a different mixer 716. Each mixer 716 is associated to a common LO 718. Each mixer 716 is connected to a channelizer switch 720 via a respective input to different low noise amplifiers (LNA) 722. Each LNA 722 is connected to a different analog to digital converter (ADC) 706. Each ADC 706 is connected to a common multiplexer selector (Mux Sel) 724. The Mux Sel 724 is connected to four different channelizers 708. Each channelizer 708 is connected to a single common combiner 726. In certain embodiments, a common combiner is a digital summer (adder) that sums up all of the channelizer outputs. The common combiner 726 is connected to a DAC 710. The DAC is connected to an IF amplifier 728 and the IF amplifier 728 is connected to an output 730.

In embodiments of the invention, the LNB receives two RF input signals from the satellite similar to the signals described above with respect to FIG. 3. One is for the vertical polarization antenna 702 and the other is for the horizontal polarization antenna 704. In many systems, the frequency band of both signals may be from 10.7-12.75 GHz. Both frequency bands are mixed down to 0.2-2.25 GHz with one mixer at 10.5 GHz. Each down converted signal is sampled by an ADC 706 with sample frequency at 6 GHz. The desired content channels are digitally tuned with digital channelizers 708 and converted to L-band signals with a high speed DAC 710 sampled at 6 GHz.

Figure 8:
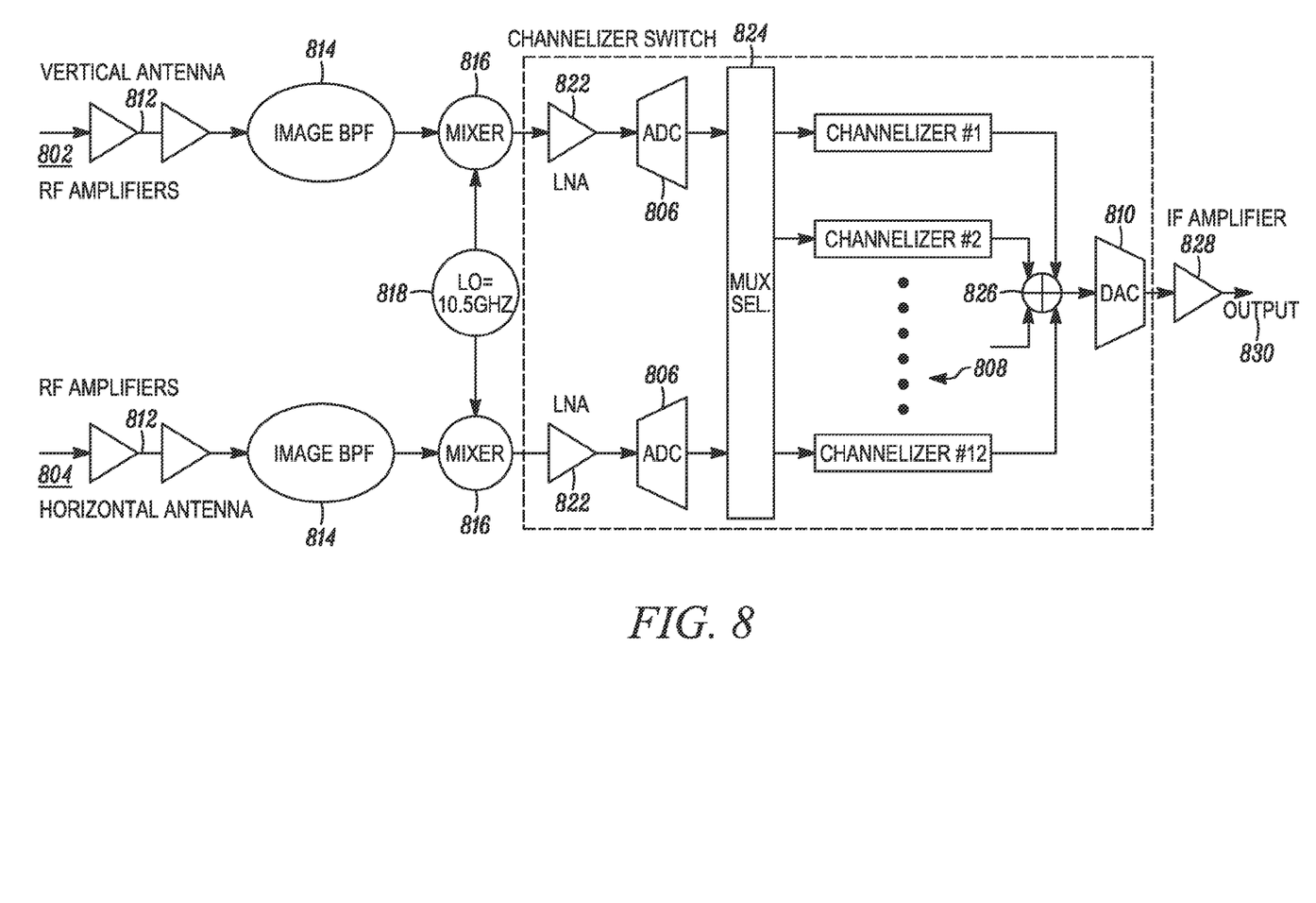
FIG. 8 illustrates a single cable LNB including a digital channelizer switch with twelve digital channelizers in accordance with an embodiment of the invention.

Single cable LNB architectures capable of utilizing a digital channelizer switch in accordance with many embodiments of the invention can utilize an arbitrary number of channelizers to allow output of an arbitrary number of content channels. A single cable LNB including a digital channelizer switch with twelve digital channelizers 808 in accordance with an embodiment of the invention is illustrated in FIG. 8. In many embodiments, an input for the vertical antenna 802 and an input for the horizontal antenna 804 are each connected to different RF amplifiers 812. Each of the RF amplifiers 812 are connected to a different image band pass filter (BPF) 814. Each band pass filter 814 is connected to a different mixer 816. Each mixer 816 is associated to a common LO 818. Each mixer 816 is connected to a channelizer switch 820 via a respective input to different low noise amplifiers (LNA) 822. Each LNA 822 is connected to a different analog to digital converter (ADC) 806. Each ADC 806 is connected to a common multiplexer selector (Mux Sel) 824. The Mux Sel 824 is connected to twelve different channelizers 808. Each channelizer 808 is connected to a single common combiner 826. The common combiner 826 is connected to a DAC 810. The DAC 810 is connected to an IF amplifier 828. The IF amplifier 828 is connected to an output 830.

In embodiments of the invention, similar to FIG. 7, digital channelizers are used to select the desired content channels, which then can be converted into an analog L-band signal including each of the selected channels using a digital to analog converter and received by a satellite receiver/decoder. However, here there are twelve channelizers 808 rather than four and therefore twelve content channels may be selected out of the satellite signal, and converted into an analog L-band signal including each of the selected channels using a digital to analog converter and received by a satellite receiver/decoder. Although twelve channelizers 808 are illustrated in FIG. 8, any number of channelizers can be utilized as appropriate to a specific application in accordance with embodiments of the invention.

In many embodiments, use of digital channelizers can enhance scalability of single cable LNB architectures compared to traditional single cable LNB implementations. LNBs in accordance with embodiments of the invention can provide for the output of an arbitrary number of content channels with the addition of additional digital channelizers. Traditional implementations typically utilize an additional tuner and SAW filter per content channel output. Also, embodiments with the digital channelizer can pack content channels for output closer together than in an all analog LNB due to the limitations imposed on analog LNBs by analog filter roll-off and the fact that sharp filters can be implemented in the digital circuit.

Multiple RF Inputs with Multiple Outputs

Figure 9:
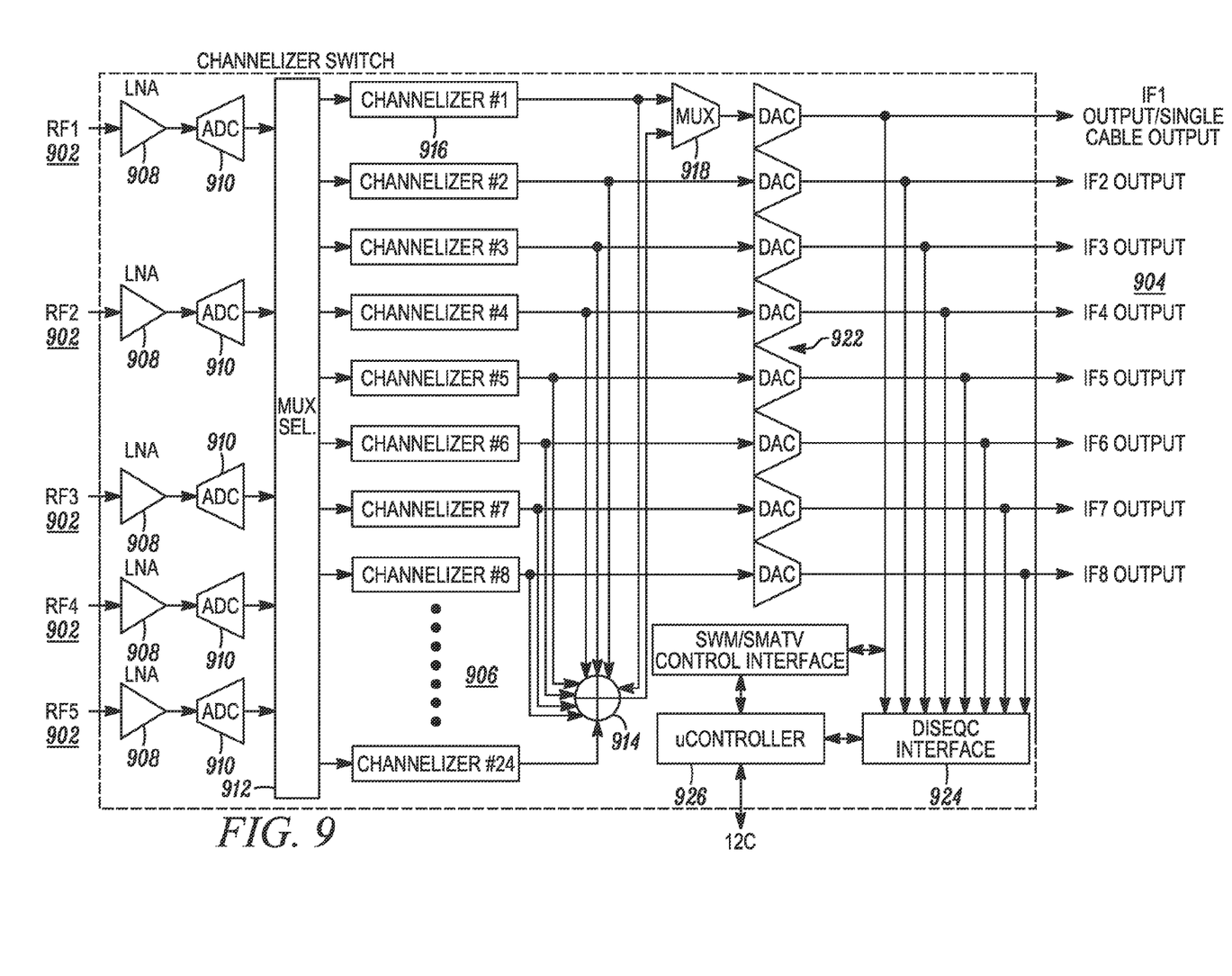
FIG. 9 illustrates a digital channelizer switch with multiple RF inputs, digital channelizers and outputs in an embodiment of the invention.

Digital channelizer switches in accordance with many embodiments of the invention can be implemented in situations that require multiple RF inputs and multiple outputs. A digital channelizer switch with multiple RF inputs in an embodiment of the invention is illustrated in FIG. 9. In many embodiments, the RF inputs 902 are each connected to different LNAs 908. Each LNA 908 is connected to different ADCs 910. Each ADC 910 is connected to a common Mux Sel 912. The Mux Sel 912 is connected to twenty four different digital channelizers 906. Each channelizer 906 is connected to a single common combiner 914. The first channelizer 916 is connected also to a multiplexer (mux) 918. The second to eighth channelizers are also connected to different DACs 922. The single common channel 914 is connected to the mux 918. The mux 918 is connected to another different DAC 922. All DACs 922 are connected to a digital satellite equipment control (DiseqC Interface) 924. All DACs 922 are also connected to different outputs 904. The DiseqC Interface 924 is connected to a micro controller (uController) 926. The microcontroller 926 may be connected to elements outside of the channelizer switch. The microcontroller is connected to a Single Wire Multi-switch (SWM) control interface or a satellite master antenna TV (SMATV) control interface 928. The SWM/SMATV 928 control interface may be connected to the DACs 922 or the outputs 904 or the DiseqC interface 924.

In many embodiments, the digital channelizer switch includes five RF inputs 902 and eight IF outputs. Also, there are twenty four channelizers 906 which can digitally tune up to twenty four content channels for output on any single IF output. Although there are five inputs in this embodiment, any number of inputs can be utilized as appropriate to a specific application in accordance with embodiments of the invention. Similarly, although there are eight outputs in this embodiment, any number of outputs can be utilized as appropriate to a specific application in accordance with embodiments of the invention.

Figure 10:
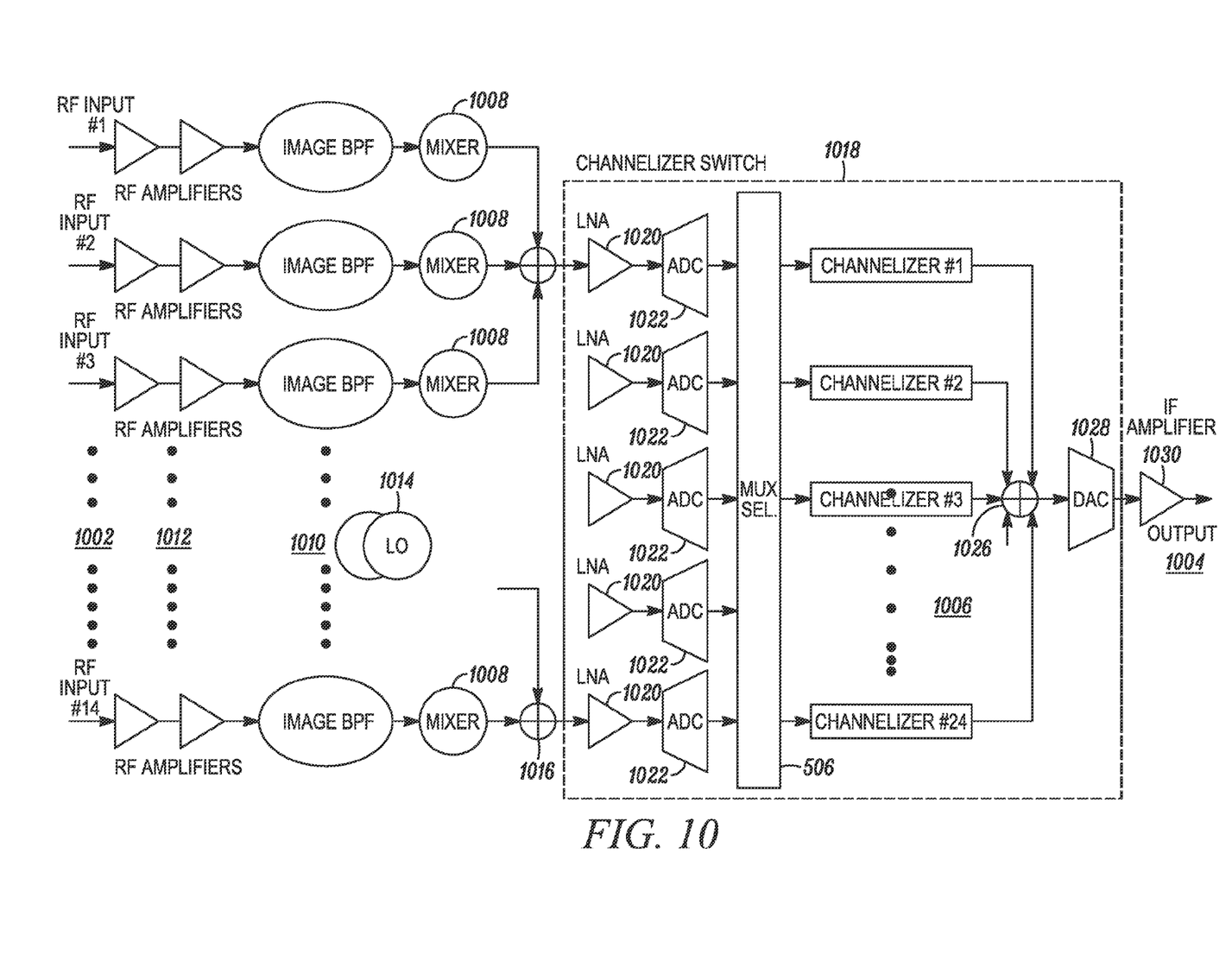
FIG. 10 illustrates a LNB including a digital channelizer switch with multiple satellite RF inputs, 24 channelizers and a single output in accordance with an embodiment of the invention.

Digital channelizer switches in accordance with many embodiments of the invention can be utilized in a variety of LNB architectures, including processing multiple IF signals converted from multiple RF signals. A LNB including an ADC based channelizer switch and multiple satellite RF inputs in accordance with an embodiment of the invention is illustrated in FIG. 10. In many embodiments, fourteen inputs 1002 from five satellites with different polarization and frequency bands are connected to different RF amplifiers 1012. Each RF amplifier 1012 is connected to different band pass filters 1010. Each band pass filter 1010 is connected to different mixers 1008. Each mixer 1008 may also be connected to a corresponding LO 1014. A certain number of mixers 1008 may be combined with different channels 1016. Each channel 1016 is connected to a channelizer switch 1018 via different LNAs 1020. Each LNA 1020 is connected to different ADCs 1022. Each ADC 1022 is connected to a common Mux Sel 1024. The Mux Sel 1024 is connected to twenty four different channelizers 1006. Each channelizer 1006 is connected to a single combiner 1026 in the channelizer switch 1018. The combiner 1026 in the channelizer switch 1018 is connected to a DAC 1028. The DAC 1028 is connected to an IF amplifier 1030. The IF amplifier 1030 is connected to an output 1004.

In many embodiments, fourteen inputs 1002 from five satellites with different polarization and frequency bands are received by the LNB. There is also one IF output 1004 with up to twenty four content channels digitally tuned by twenty four channelizers 1006. Aspects of this embodiment are compatible with the Single Wire Multi-switch technology of DirecTV in El Segundo, Calif. Although fourteen inputs from five satellites are featured in the illustrated embodiment, any number of inputs from any number of satellites can be utilized as appropriate to a specific application in accordance with embodiments of the invention. In addition, the number of content channels digitally tuned using digital channelizers can be determined by the requirements of a specific application.

The 14 satellite RF inputs 1002 can receive signals having different polarization and frequency bands such as the Ku-band at 12.2-12.7 GHz, Ka-band lo at 18.3-18.8 GHz and Ka-band hi at 19.7-20.2 GHz. These satellite signals are first filtered by band-pass filters 1010 for each RF input signal and down converted with mixers 1008, for example the Ku-band may use a LO at 11.25 GHz and the Ka-band may use a LO at 18.05 GHz. For the Ku-band, the down converted frequency band may be 950-1450 Mhz. For Ka-band lo, the down converted signal may be between 250-750 MHz. For Ka-band hi, the down converted signal may be between 1650-2150 MHz. Three down converted signals are then combined with a summer to produce a signal at 250-2150 MHz. That combined signal from the summer is received by the channelizer switch and sampled by an ADC at 6 GS/sec.

Digital Channelizer Switch with a Single RF Input

Figure 11:
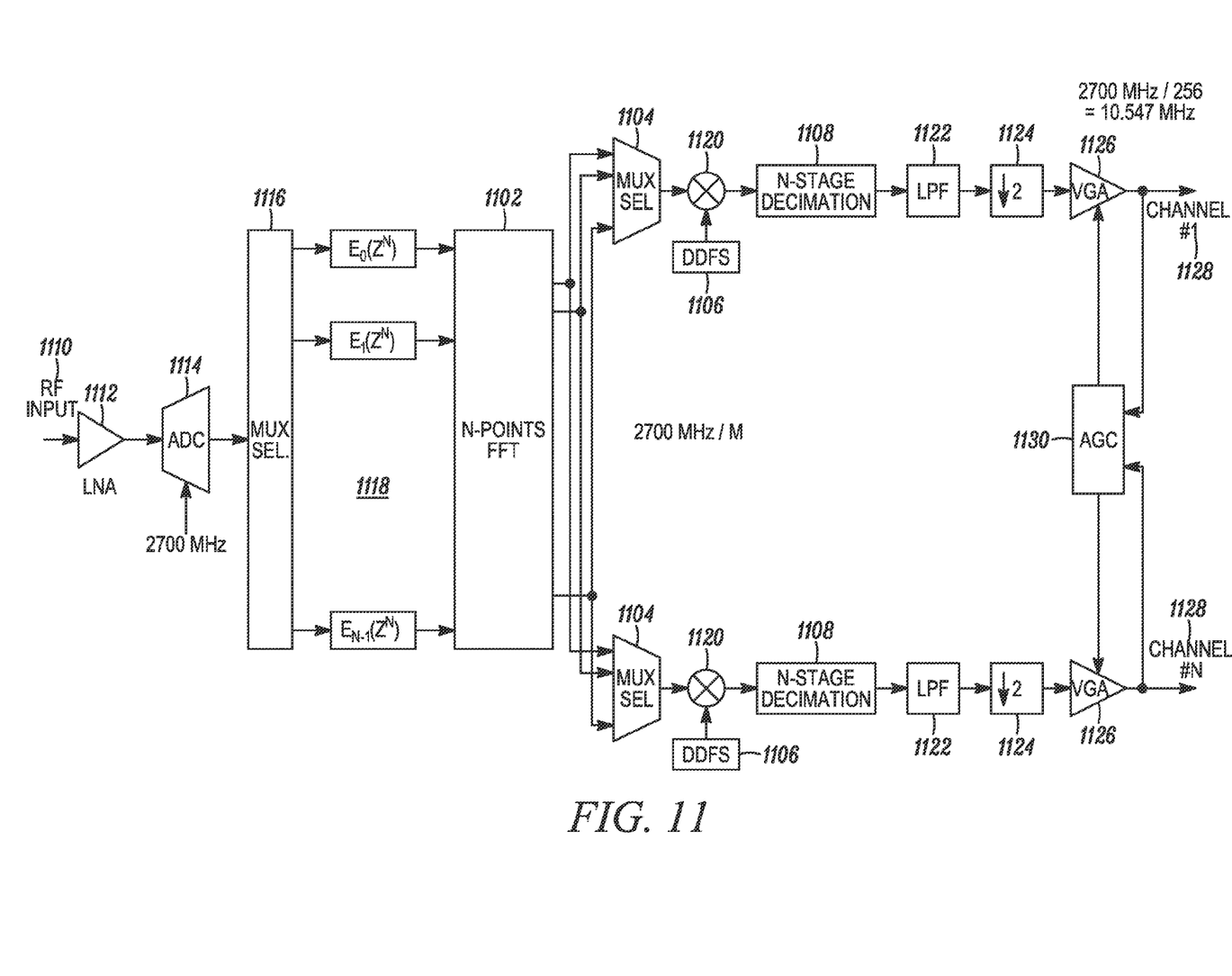
FIG. 11 illustrates a digital channelizer switch with a single input for an arbitrary number of channels in accordance with an embodiment of the invention.

Digital channelizer switches in accordance with many embodiments of the invention can utilize a single RF input for digital selection of any number of channels from the RF input. A channelizer switch in accordance with an embodiment of the invention is illustrated in FIG. 11. In many embodiments, an RF input 1110 is connected to an LNA 1112. The LNA 1112 is connected to an ADC 1114. The ADC 1114 is connected to a demultiplexer (demux) 1116. The demux 1116 is connected to poly-phase filters 1118. Each poly-phase filter 1118 is connected to an input of one N-point FFT 1102. The N-points FFT 1102 is connected to two multiplexers, or multiplexer selectors (Mux Sel) 1104. Each Mux Sel 1104 is connected to a different mixer 1120. Each mixer 1120 is also connected with a different Direct Digital Frequency Synthesis (DDFS) 1106 along with different N-stage decimation 1108. Each N-stage decimation 1108 is connected to a low pass filter (LPF) 1122. Each LPF 1122 is connected to a decimator 1124 for down sampling by two. Each decimator 1124 is connected to a different Variable Gain Amplifier (VGA) 1126. Each VGA 1126 is connected to separate channel outputs 1128. Both VGAs 1126 and both channel outputs 1128 are controlled with an automatic gain control (AGC) 1130.

In many embodiments, a Fast Fourier Transform (FFT) based channelizer 1102 is used for coarse frequency tuning. For example, the outputs may be N_fft/2 overlapped channels at 2.7 GHz/M (i.e. where M in FIG. 11 is chosen to be N_fft/4). There may be two choices for N_fft: 32 and 64. A poly-phase filter may be used for better pass-band and stop-band response of the filter bank. One example of a poly-phase filter design is the Chebyshev window. The window length may be equal to N_fft for a simple implementation. In other embodiments, any of a number of different filters can be utilized in the band pass filtering of the channels. Given a real input, only half of the FFT outputs are needed. The FFT Channelizer 1102 outputs to the multiplexer selectors (Mux Sel) 1104. For example, there may be 32 mux for selecting N_fft/2 channelizer outputs for each desired channel. There may also be direct digital frequency synthesis (DDFS) 1106 based fine frequency tuning for each content channel where each fine frequency tuning block includes one complex multiplier and one DDFS running at 2.7 GHz/M. The illustrated embodiment also features decimation filters 1108 and Adjacent Channel Interference (ACI) rejection filters. There may be multiple stages of decimation by two filters to bring the sample rate down to 10.547 MHz. There may also be three types of decimation by two filters used in this design. Also, four fix coefficients filters may be used for ACI rejection. For example, a half-band (default for eight MHz channels), ⅖ band, third-band (default for six MHz channels), and a quarter-band. Lastly, this embodiment features a variable gain stage and automatic gain control (AGC), where variable gain may be at the output stage and a single AGC processing unit is used for all 32 channels' output gain control.

Therefore, the channelizer switch illustrated in FIG. 11 is able to take an RF input 1110 and digitally select a number of content channels within a satellite signal from the RF input 1110 for content decoding. Although a specific embodiment of a channelizer switch is illustrated in FIG. 11, any of a variety digital signal processing circuits can be utilized to digitally select one or more content channels within a digitized satellite signal in accordance with embodiments of the invention.

Although the present invention has been described in certain specific embodiments, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed is:

1. A system configured to select at least one content channel from a plurality of input signals, where each input signal comprises a plurality of content channels modulated on a carrier, the system comprising:
    a plurality of inputs, where each of the plurality of inputs is configured to receive an input signal comprising a plurality of content channels modulated on a carrier;
    a plurality of mixers, where each mixer is connected to an input and is configured to down convert the content channels to an intermediate frequency signal;
    a digital channelizer switch comprising:
        a plurality of high speed analog to digital converters, where each high speed analog to digital converter is configured to digitize an intermediate frequency signal generated by one of the mixers;
        a plurality of digital channelizers, where each digital channelizer is configured to digitally tune a content channel from a digitized intermediate frequency signal generated by one of the high speed analog to digital converters;
        a multiplexer configured to select digitized intermediate frequency signals generated by the plurality of high speed analog to digital converters as inputs to the plurality of digital channelizers; and
        at least one high speed digital to analog converter, where each high speed digital to analog converter is configured to generate an analog output signal using a content channel digitally tuned from one of the at least one digitized intermediate frequency signals by a digital channelizer.

2. The system of claim 1, wherein:
    the digital channelizer switch further comprises a common combiner configured to digitally combine a plurality of content channels digitally tuned from at least one of the digitized intermediate frequency signals by the plurality of digital channelizers; and
    one of the at least one high speed digital to analog converters is configured to generate an analog output signal using the output of the common combiner.

3. The system of claim 1, wherein the mixer comprises a local oscillator.

4. The system of claim 1, wherein the content channel comprises a digital content channel.

5. The system of claim 1, wherein the content channel comprises an analog content channel.

6. The system of claim 1, wherein the frequency of the input signal is in the range from 10.7 GHz to 12.75 GHz.

7. The system of claim 1, wherein the frequency of the intermediate frequency signal is in the range from 0.2 GHz to 2.25 GHz.

8. The system of claim 1, wherein the frequency of the analog output signal is in the range from 950 MHz to 2150 MHz.

9. The system of claim 1, wherein the frequency of the analog output signal is in the range from 950 MHz to 1450 MHz.

10. The system of claim 1, wherein the high speed analog to digital converter is configured to sample the intermediate frequency signal at a frequency at least twice the highest frequency of the intermediate frequency signal.

* * * * *